Willard Farnham
INVENTOR
BY BUCKHORN, BLORE, KLARQUIST & SPARKMAN
ATTORNEYS

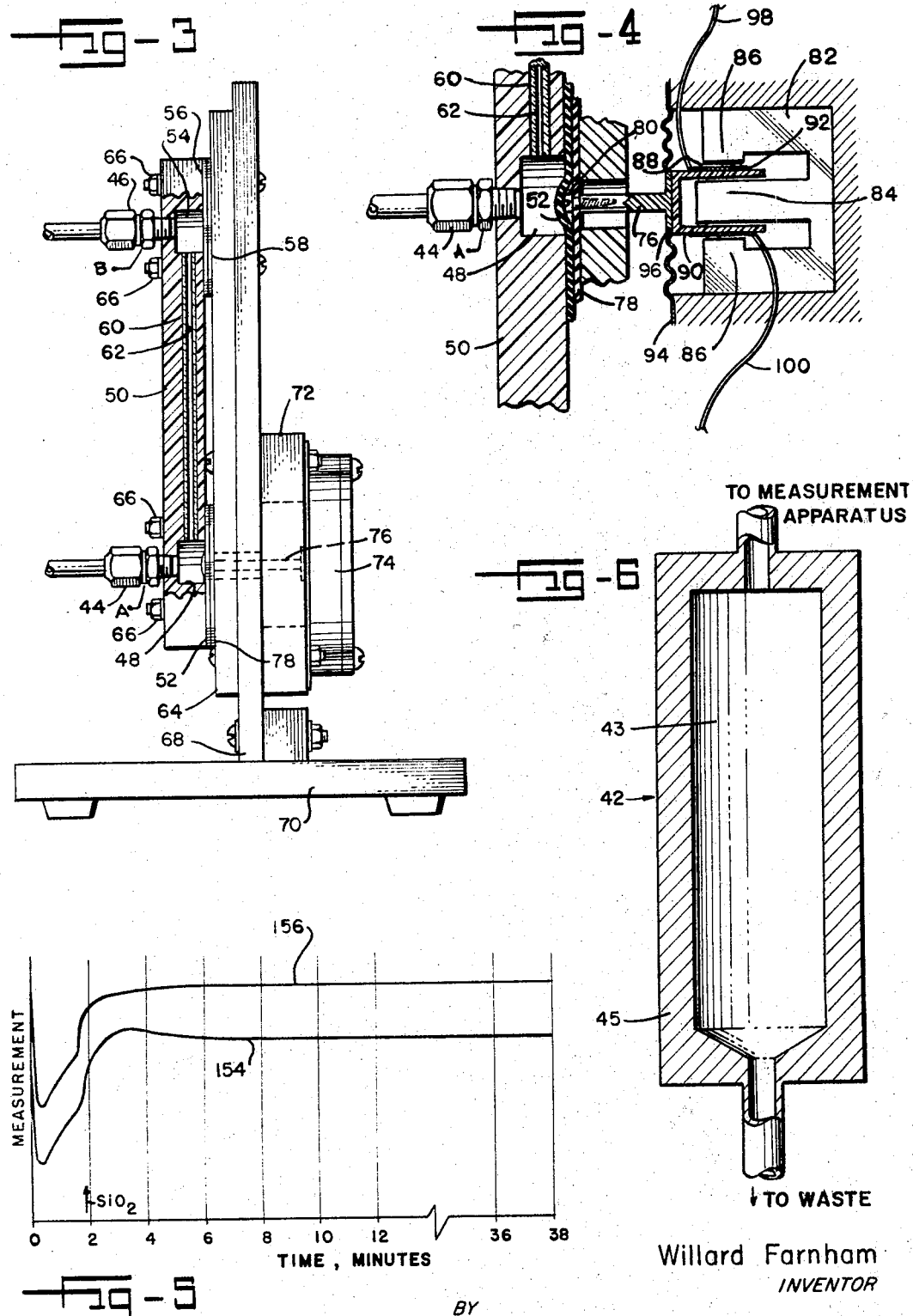

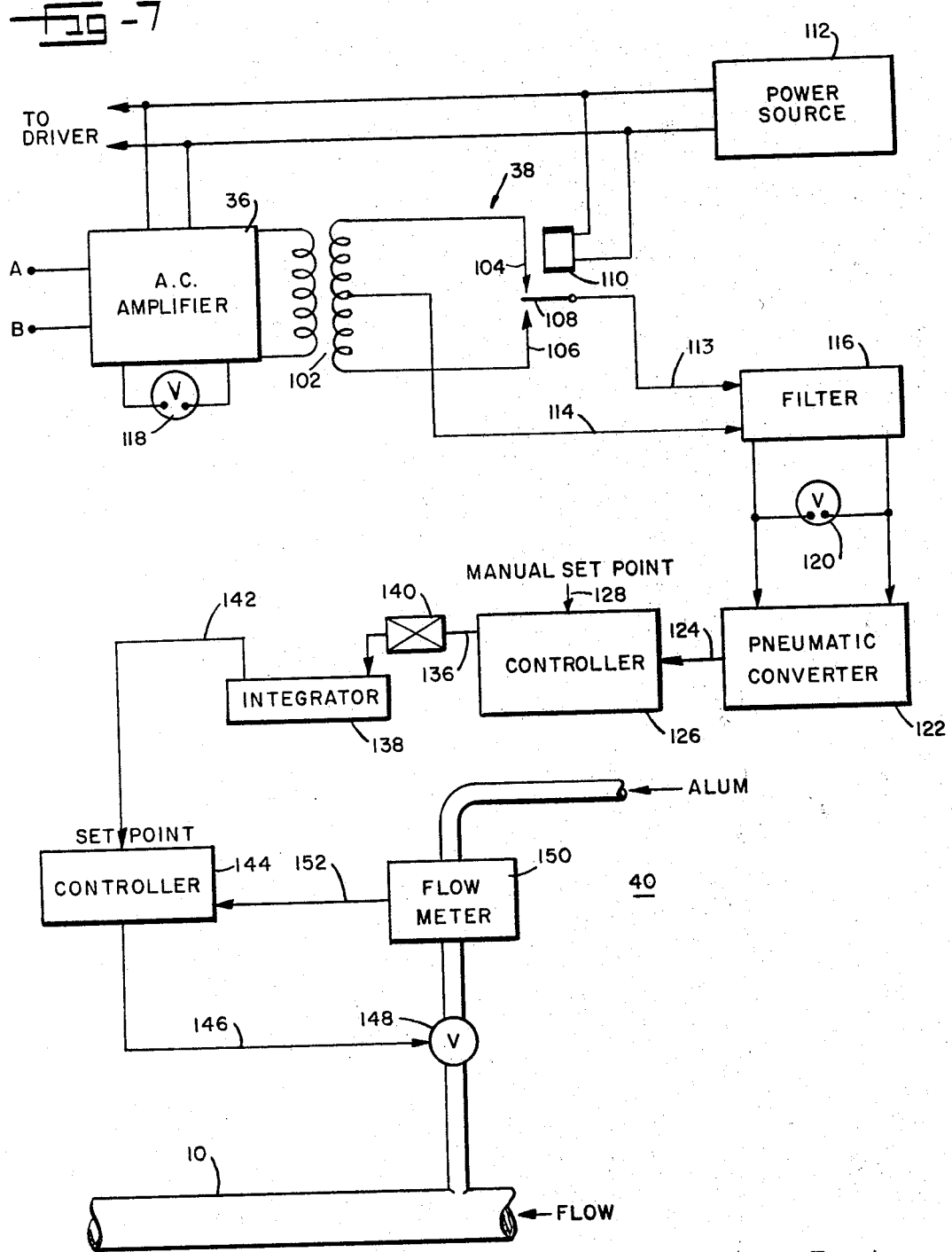

United States Patent Office 3,441,956
Patented Apr. 29, 1969

3,441,956
LIQUID TREATMENT METHOD AND APPARATUS
Willard Farnham, 3055 NE. Dunckley St.,
Portland, Oreg. 97212
Filed Jan. 23, 1967, Ser. No. 610,942
Int. Cl. C02b 1/40, 1/20
U.S. Cl. 210—53    18 Claims

ABSTRACT OF THE DISCLOSURE

A continuous method and apparatus for treating liquid, such as water having particles suspended therein, by the addition of a double-layer controlling additive such as alum. An energy function in the form of an alternating function of streaming potential is continuously measured on a stream of such liquid, and the addition of the double-layer controlling additive is adjusted to maintain the double-layer properties of the liquid at a given level. A second coagulant such as activated silica may be added before the liquid is passed to settling basins and filters.

Background of the invention

One of the problems associated with the purification of water and other liquids is the removal from such liquid of turbidity particles and the like suspended therein. Conventionally, a coagulant material is added to the liquid whereby the particles may be suitably filtered therefrom. The amount of such coagulant material added may be determined from observing the clairty of the water after the attempted filtering of the suspended particles. Observations of clarity of the filtered liquid are only roughly effective in determining the amount of coagulant added, and then only after the fact. Many attempts have been made heretofore to control the addition of additives based on various measurable properties of the filtered liquid. Among the measurements that have been made are pH, alkalinity, oxidation-reduction potential and zeta potential. In each case, however, circumstances are encountered in actual practice in which the parameter receiving attention fails to predict the clearwell condition. Other attempts have been made to base the addition of additives upon the DC streaming potential, or the AC streaming current. However, so far as I know, such attempts have been either unsuccessful or have been conducted on the discontinuous or intermittent basis, and so far as I know no liquid treatment system has been available heretofore for continuously controlling the addition of a coagulant material with great accuracy.

Summary of the invention

The method and apparatus of the present invention continuously measures an energy component contributing to interaction of particles or surfaces in a liquid. This energy component is measured in the form of an alternating function of streaming potential in such liquid. Streaming potential is apparently generated by the movement of positive ions in the liquid. A liquid-conveying passage receives a continuous stream of liquid from the system under consideration and an alternating function of streaming potential is determined with respect to such stream. The flow of the substantially continuous stream is modulated at an alternating rate so that the streaming potential has such an alternating or AC component. This alternating function is free of extraneous interfering potentials and can be continuously derived and used for substantially continuously controlling the addition of a coagulant material to the liquid under consideration. It is found this continuous method is capable of continuously predicting and maintaining a substantially pure clearwell despite changes in turbidity or the like of the liquid as initially received. Such exact control is attained and suspended particles are continuously removed to such a degree that the flow through a liquid treatment plant can be substantially increased, for example, by 100% without in any way affecting the purity of the clearwell. In addition to maintenance of the purity of the liquid, the method and apparatus according to the present invention has the additional effect of inhibiting "breakthrough" of turbid particles which have become trapped in the system filtering means, even when a high rate of flow is attained. Holding coagulation always at maximum effectiveness, automatically, can thus make possible a substantial increase in operating rate for a filtration plant.

Accordingly, it is an object of the present invention to provide an improved method and apparatus for continuously and automatically adjusting coagulation in a water treatment plant or the like.

Another object of the present invention is to provide a method and apparatus for measuring an energy component of a particle surface, capable of predicting the attraction between such particles, or between such particles and a surface, on a substantially continuous basis.

Another object of the present invention is to provide a method and apparatus for enhancing the purity of a filtered liquid product.

It is another object of the present invention to achieve increased capacity in water treatment plants.

The subject matter which I regard as my invention is particularly pointed out and distinctly claimed in the concluding portion of this specification. The invention, however, both as to organization and method of operation, together with further advantages and objects thereof, may best be understood by reference to the following description taken in conjunction with the accompanying drawings wherein the like reference characters refer to like elements:

Drawings

FIG. 3 is a side view of the FIG. 2 measurement apparatus;

FIG. 4 is a detail of a portion of the measurement apparatus of FIGS. 2 and 3;

FIG. 5 is a plot of measurements taken at various locations in the FIG. 1 filtration plant;

FIG. 6 is a cross section of an isolating means employed with the measurement apparatus of FIGS. 2 and 3; and FIG. 7 is a schematic diagram of electric and penumatic circuits employed with the FIG. 1 filtration plant.

Detailed description

Figure 1:
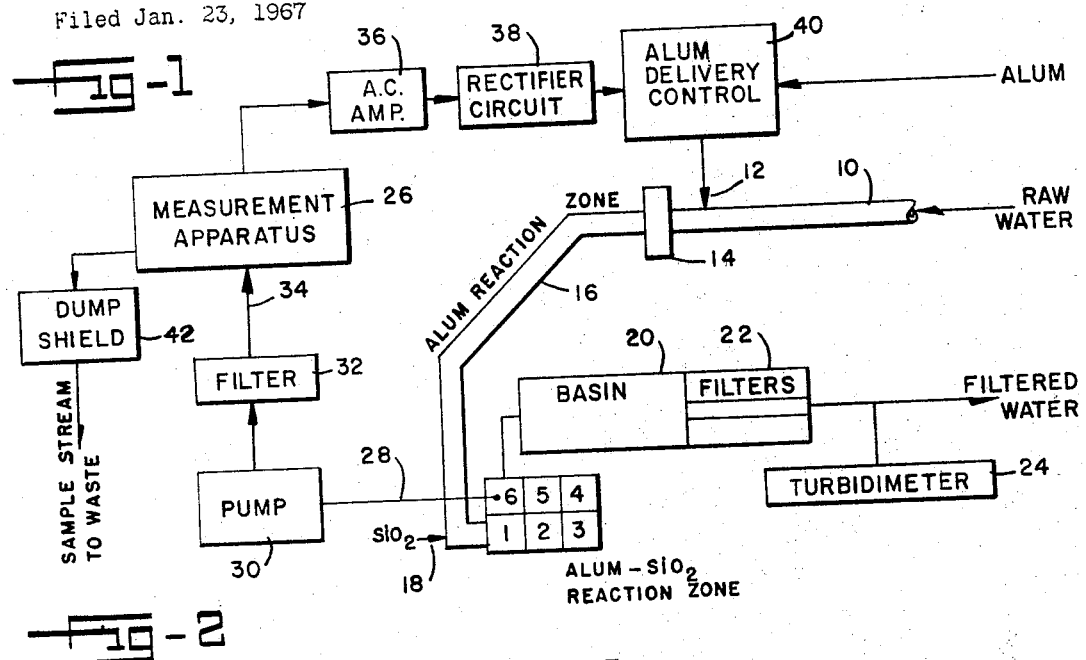
FIG. 1 is a schematic flow diagram of a filtration plant employing the method and apparatus of the present invention.

The filtration plant of FIG. 1 has for its purpose the purification of turbid water through filtering means and the like for providing a pure water output. The plant adds a coagulant material in order to control the properties of the water being filtered so that optimum filtering may take place. Filtering can take place when the turbidity particles or the like approach closely enough to the filter surface to become lodged thereon and removed from the water passing through the present system measures an important parameter related to the layered arrangement of ions and molecules commonly termed the electrical double-layer, or simply the double-layer, which forms on any surface immersed in water, including the surfaces of turbidity particles and filter media particles. Coagulant material or the like is added to the water in response to this measurement for controlling the double-layer on turbidity particles and filter media particles such that capture of the turbidity particles by the filter may take place. Moreover, such capture produces adherence to such a degree that there is little tendency of subsequent breakthrough of particles already captured by the filter media. Therefore, since filtering is effective within close tolerances, and since breakthrough is substantially limited, a substantial increase in operating rate or liquid flow through the filter is made possible.

The double-layer associated with particles and surfaces exposed to water in a water plant is believed to comprise negative ions adhering closely to such surface or particle and a positive cloud of ions above the negative surface ions. Without control of the double-layer on particles and surfaces, the double-layer has a deleterious effect upon the adherence of one particle or surface to another. When such particles or surfaces are brought closely together, the negative surface ions of the double-layer tend to cause repulsion therebetween. However, it has been found that the double-layer can be controlled such that the effect of the negative charge is substantially neutralized. Coagulant material or the like has this effect not only with respect to particles and a filter surface, but, in addition, individual particles may then come together for easier filtering. However, the control over such material to provide optimum capture of particles is not easily achieved.

In this patent application, the material applied to control the capture of particles will be termed a double-layer controlling additive, generally comprising a coagulant such as alum. Other materials may comprise ferric chloride titanium tetrachloride, or in general other materials which ionize in water. The mechanism by which double-layer controlling additives improve or affect the capture of particles with respect to one another or upon filter surfaces is not completely understood.

Referring to FIG. 1, illustrating a filtration plant constructed in accordance with the present invention, raw water is introduced through conduit 10 and has added thereto a double-layer controlling additive through a valve indicated at 12. The double-layer controlling additive is suitably alum or one of the other materials of the type mentioned above. The water with additive proceeds in the conduit to a mixing valve 14 which may take the form of a mixing orifice or pipe line mixer for insuring substantially complete mixing of the additive in the water within about one or two seconds. The water then proceeds through a length of conduit 16 comprising a reaction zone wherein the additive material, e.g., the alum, is effective to alter the energy component on the surface of particles contained in the water. At location 18 at the end of the reaction zone, a coagulant aid, e.g., activated silica is added to the water. From this point the water proceeds into a plurality of flocculating tanks numbered 1, 2, 3, 4, 5 and 6, comprising a reaction zone for the double-layer controlling additive and the coagulant aid. These tanks are serially related with the output of each tank forming the input for the next tank in numerical order. As understood by those skilled in the art, some flocculation and settling of turbidity particles may take place in these tanks. From tank No. 6, the water proceeds into a settling basin 20 followed by a plurality of filters 22. The filters may comprise a suitable media, such as sand or coal, providing a large surface area for the water to pass through and upon which particles may adhere. The filtered water output may be measured with a turbidimeter 24.

According to the present invention, a measurement apparatus 26 is employed to measure an energy component of a particle surface in the form of an alternating function of streaming potential. This energy component of a particle surface relates to the ability of the surface of particles and other surfaces to repel one another, or alternatively, their ability to adhere to one another. According to the FIG. 1 filtration plant, a continuous stream of liquid is withdrawn from No. 6 flocculation tank at 28 by means of pump 30 and is presented to measurement apparatus 26 through a suitable filter means 32 which includes fine screening means for preventing large particles from reaching the measurement apparatus. Such screening means also assists in keeping undesirable air bubbles from the measurement apparatus 26.

An alternating function of streaming potential is measured by measurement apparatus 26 for the continuous stream of liquid presented thereto at 34 in a manner hereinafter more fully described. The electrical output of the measurement apparatus is applied to AC amplifier 36 driving rectifier circuit 38. The output of rectifier circuit 38 is applied to delivery control means 40 which substantially continuously adjusts the supply of double-layer controlling additive 12. The stream of liquid after having passed through measurment apparatus 26 is disposed of through a dump shield 42.

Figure 2:
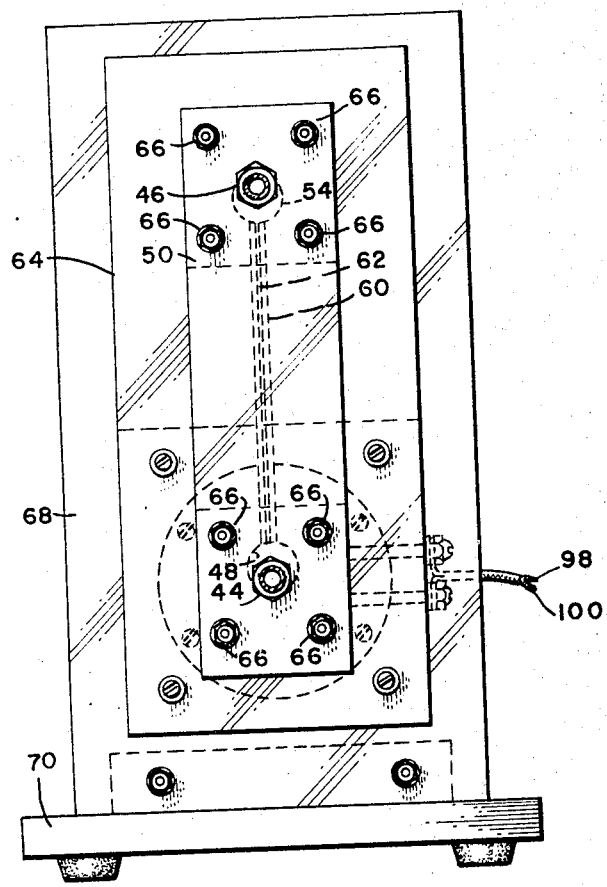
FIG. 2 is a front view of measurement apparatus according to the present invention.

Referring to FIGS. 2, 3 and 4, illustrating the measurement apparatus 26 in greater detail, such measurement apparatus includes a liquid input connection 44 and an output connection 46 between which a portion of the liquid in the filtration system is passed in a continuous stream. Each of these connections suitably comprises a metal coupling to which electrical connections A and B may be suitably attached. Connection 44 provides access to an enlarged bore 48 contained in upright member 50, the latter being formed of electrically insulating material, suitably plastic. Bore 48 extends from connection 44 horizontally to the opposite side of member 50 where such bore is closed by a first rubber gasket 52. Outlet connection 46 similarly provides access to a horizontal bore 54 extending through member 50 and positioned vertically above bore 48. The end of bore 54 remote from connection 46 is closed with a first rubber gasket 56 backed by a second rubber gasket 58.

Between bores 48 and 54 there extends a glass tube 60 housed vertically within member 50 and provided with a passage in the form of a capillary 62 extending from bore 48 to bore 54. The capillary diameter is suitably approximately 1½ millimeters but may be as small as ⅗₆ millimeter or as large as ¼ inch in some cases. For the electrical measurements hereinafter noted, a capillary of 1½ millimeters was employed in a tube having a length of about 20 cm.

The upright member 50 is secured to a backplate 64, also formed of an insulating material, suitably plastic, by means of bolts 66. These bolts draw upright member 50 against backplate 64 and compress the rubber gaskets therebetween. Backplate 64 is in turn joined to upright support 68 secured to base 70. Upright support 68 is suitably also formed of plastic, but may alternatively be formed of steel for improved electrostatic and electromagnetic shielding. An adapter plate 72 is secured to the opposite side of upright support 68 and this adapter plate is also suitably formed of plastic. An electromagnetic driver 74 is in turn mounted on adapter plate 72 and includes a vibrating pin 76 extending through cylindrical openings in adapter plate 72, upright support 68 and backplate 64 where pin 76 is joined to a rubber gasket 78 located between backplate 64 and gasket 52. A small screw 80 suitably secures gasket 78 to pin 76. The vibration of pin 76 is conveyed by means of gaskets 78 and 52 to such liquid as may be received in bore 48 from inlet connection 44.

The driver mechanism is more clearly illustrated in FIG. 4 and includes a permanent magnet 82 having facing pole pieces 84 and 86 so constructed as to provide an annular gap 88 therebetween. A cylinder 90 carrying an actuating coil 92 is mounted in gap 88 on the flexible spider 94 carrying cylinder 90 at one end thereof and also carrying a disc member 96 to which pin 76 is secured. Electrical connections 98 and 100 are attached to either end of coil 92. With coil 92 properly disposed in the gap 88 between the pole pieces, an alternating current applied between leads 98 and 100 causes vibration of cylinder 90 as well as dics 96 and pin 76 attached thereto at an alternating frequency corresponding to the frequency of the alternating current applied to the leads. In an exemplary construction according to the present invention, an alternating current of 46 cycles per second is applied to these leads resulting in vibration of that frequency at gasket 52. The vibration in gasket 52 results in modulation of the flow of a liquid presented to inlet connection 44 and passing up through capillary 62.

After passage of liquid stream through the measurement device, isolation of the stream is required for attaining meaningful measurement. The liquid is emptied through dump shield 42 as indicated in FIGS. 1 and 6, such shield including a central tank 43 having a steel shell 45. In this tank, outflow from the measuring device must form into droplets for electrically and physically isolating the liquid output of the measuring apparatus from the rest of the system. The steel shell electrically and magnetically shields this dispersion.

In operation of the device illustrated in FIGS. 2, 3 and 4, a continuous stream of liquid from a liquid treatment system or the like is received by the inlet connection 44 and passes through capillary 62 for discharge through outlet connection 46. These connections being metallic, also form electrical terminals as hereinbefore indicated at either end of the liquid column extending upward through capillary 62. A DC potential may be measured between connections 44 and 46, and this potential is apparently caused by the movement of positive ions in the double-layer associated with the inside of the capillary walls and because of movement of the water is called a streaming potential. This potential should be a measure of an energy component of a particle surface in the liquid and more specifically the energy component of the surface of the inside of the capillary, but this potential has not been found effective or reliable in measurement of such energy component even if a device measuring such potential is isolated from the discharging stream by a dump shield, perhaps because of interfering galvanic potentials and the like. According to the present invention, driver 74 modulates the flow of the continuous stream of liquid passing upward through capillary 62 at an alternating frequency. The result is an AC potential component or alternating function of streaming potential measurable between connection 44 and connection 46 or similar electrodes in the stream. This alternating function of streaming potential is applied to an AC amplifier which detects and measures only this alternating function. This function is found to quite accurately measure the energy component of a particle surface so that the repulsion or attraction between particles or particles and other surfaces may be accurately predicted and predetermined in a continuous manner.

There are certain desirable limitations on the size of the capillary 62 for desirable operation. The continuous stream of liquid into this measurement apparatus is suitably taken from a continuous water filtration plant as illustrated in FIG. 1. Capillary 62 should have a sufficient diameter such that at a given pressure, the flow through the capillary in the measurement apparatus "keeps up" with the filtration plant so as to make a continuous valid measurement. However, the capillary should not desirably exceed one-fourth inch in diameter because the size of an isolating dump shield for handling the outlet stream then becomes quite large. In addition, the length of the capillary should not be so long that it slows down the fluid such that rapid testing of changing conditions in the filtration plant is not possible. A length of approximately 20 centimeters is appropriate. Moreover, a reasonably rapid flowing continuous stream completely eliminates any problems relating to a deposit of turbid particles and the like within the capillary. It has been found with this measurement apparatus that no cleaning thereof is required but rather the apparatus is apparently self-cleaning and the passage comprising the capillary is substantially clear of any deposit. This lack of deposit is related to the laminar flow taking place upward in the capillary. A back pressure of approximately 15 pounds per square inch is maintained on the liquid passing through the capillary and the flow is 600 to 1000 ml. per minute.

Although a round capillary is illustrated in the embodiments of FIGS. 2, 3 and 4, it is understood that the passage for the liquid is not limited to a round capillary cross section. The laminar flow under similar conditions can be established, for example, in a passage of rectangular cross section, e.g., established between two insulated plates spaced from one another on the order of the diameter of the capillary employed and between which the liquid is continuously forced to flow. Whether a liquid passage is employed in the form of a capillary or in the form of another passage having reasonably closely spaced walls, it is nonetheless desirable that this pasasge be disposed approximately vertically or at least other than horizontally. The vertical disposition inhibits the formation and trapping of air bubbles in the passage which would, of course, be deleterious to any valid and continuous electrical measurement.

The AC streaming potential is brought about by movement of ions contained in the liquid, e.g., the ionized coagulating material, hydrogen and hydroxyl ions and the like, without the addition of any further conductive material. Also, of course, the streaming potential is affected by the presence of particles in the liquid which are to be removed therefrom in a filtration plant or the like. The AC streaming potential is a measure of the energy component contributing to an interaction by a particle or a surface, and is more patricularly measured by the energy component of a surface, e.g., of the capillary in the measurement apparatus, substantially isolated from interaction from other particles or surfaces because of the stream of laminar flow. However, the measurement continuously measures the energy component of the system and is very sensitive to changes and introduction of turbidity, e.g., at the system input. Change in the energy component in one part of the system appears to immediately affect the energy component elsewhere.

While the theoretical basis for the measurement is not completely understood, nevertheless it is found that a definite value or series of values of this energy component as measured by the aforementioned streaming potential is effective in determining and controlling a clearwell or a given repulsive or attractive condition of particles carried in the liquid. The following table sets forth the measured R.M.S. value of AC streaming potential measured with the apparauts of FIGS. 2, 3 and 4 effective in a filtration plant such as illustrated in FIG. 1 for maintaining a pure clearwell. The AC streaming potentails effective for predicting a pure clearwell are described as "zones" in the left-hand column. The AC potential or energy component is in millivolts R.M.S. for a back pressure of 15 p.s.i.g. in the capillary tube at a frequency of 46 cycles per second provided by driver 74. The capillary tube was 1½ millimeters in diameter and approximately 20 cm. long. As indicated in parentheses after the AC potentials, a sign is associated with each such potential and refers to the phase thereof in a manner hereinafter more fully described. The approximate tolerance is also indicated after each potential for defining the approximate range within which successful operation takes place. In the Energy of Interaction column, the sign indicates the repulsive or attractive force between particles and surfaces for each of the aforementioned potentials in the respective zones. A positive sign in this column indicates repulsion and a negative sign indicates attraction. Thus, the sign indicates the relative energy required for forcing a particle up to the surface of another particle or surface of filter media. Each of the aforementioned potentials associated with a negative energy of interaction represents those potentials at which it is found particles will most advantageously adhere to one another, and surface of filter media particles. Thus, when the measurement apparatus is employed with the system, according to FIG. 1, any one of these potentials as measured is indicative of a condition of the system where capture of turbid particles by filter media most advantageously takes place. As also stated in the table, the zones are all relatively strong and substantially complete capture of turbid particles will take place in the system when the potential is registered at such levels.

TABLE

| Zone | Energy component, AC streaming potential, millivolts, r.m.s. | Energy of interaction | |
|---|---|---|---|
| | | Sign | Magnitude |
| C+ | 6.6(+)±.2 | {+/−} | Strong. |
| B+ | 2.6(+)−±.1 | {+/−} | Do. |
| A+ | .16(+)±.1 | {+/−} | Do. |
| A− | .14(−)±.1 | {0/−} | Do. |
| B− | 2.4(−)±.1 | {+/−} | Do. |

The various zones may be indicative of energy wells wherein a particle may reside relative to the surface of filter media or some other surface, but it is understood that the present invention is not limited by theory of operation. It should also be noted that these potential levels are affected by the relative placement of electrodes in the stream of liquid, by the diameter of the stream, by the amplitude of the AC modulation, and by various other factors, whereby a different set of AC streaming potentials may be indicated as effective in the case of a measurement apparatus having somewhat different physical measurements. However, the general pattern of potentials for such apparatus will be substantially the same, wherein a number of alternating streaming potentials are indicative of energy components which will enhance particle capture.

Apparently at such values, the energy components of the interacting particles or surfaces combine such that the repulsion of the particles or surfaces usually attributed to the negative layer is overcome and the net interaction between particles or surfaces becomes one of attraction.

According to the present invention, the alternating component of streaming potential is not only measured, but the constants of a system are advantageously controlled for maintaining one of the particular alternating streaming potentials such that capture most advantageously continues to take place.

Referring to FIG. 7, the streaming potential from the measurement device terminals A and B is coupled to similar terminals A and B on AC amplifier 36 (similarly indicated in FIG. 1) driving a rectifier circuit 38 including a center tapped transformer 102, the secondary terminals of which are connected to contacts 104 and 106 and wherein a movable contact 108 is located therebetween for alternative connection with either contact 104 or contact 106. Movable contact 108 is driven by an operating coil 110 powered by power source 112 which also provides the alternating current frequency to the driver 74. The movable contact 108 will therefore be driven synchronously with the driver to provide synchronous rectification of the AC streaming potential across terminals 113 and 114. The AC amplifier passes and amplifies only the AC component of streaming potential but this component is synchronously rectified into a DC value supplied at terminals 113 and 114, terminal 114 being connected to the center tap of the secondary of transformer 102. Therefore, this value will have a sign depending upon the phase of the AC streaming potential. This voltage is then filtered by filter 116, and then provided to delivery control 40 (also indicated in FIG. 1). The AC streaming potential is indicated on voltmeter 118, such voltmeter measuring substantially the voltage presented between terminals A and B, and this is potential indicated in the second column of Table I. Alternatively, the voltage may be measured DC-wise by voltmeter 120 having a zero center for determining the relative sign or phase of the AC streaming potential. Voltmeter 120 may be calibrated to read substantially the same values as voltmeter 118.

The voltage from the filter 116 is supplied to a pneumatic converter wherein such voltage level is changed to a value of air pressure. Converter 122 is suitably a Leeds and Northrup electropneumatic converter. The output 124 thereof is applied to controller 126 which may comprise a Foxboro Instrument Company model 40 controller providing a pneumatic output, the change in which is proportional to deviation and the rate of change of the deviation of the input thereof and also to an integrated value of the input deviation. A pneumatic signal providing a manual set point is introduced at 128 with respect to which the deviation of the signal at 124 is measured. This manual set point is manually set to correspond to a selected alternating current component of streaming potential as hereinbefore described. The output 136 of controller 126 is provided to an integrator 138 through a restrictor 140. In integrator 138 is an air tank of such size that when coupled with the restrictor approximately 63 percent of the change at 136 is provided as a pneumatic output at 142 with a time lag of approximately one-half hour before such 63% value is fully transmitted. This integration has an advantageous effect in enhancing system stabilization. The signal at 142 is supplied as the set point to another controller 144 of the same type as controller 126. The output 146 of controller 144 operates a valve 148 through which a double-layer controlling additive, e.g., alum in solution, is added to conduit 10. A flowmeter 150 in the additive line provides feedback at 152 to controller 144 for indicating when the desired rate of flow is achieved.

As thus becomes apparent from a review of the apparatus illustrated in FIG. 7 and the system illustrated in FIG. 1, automatic control of the double-layer controlling material dose is provided in accordance with the present invention. The double-layer controlling additive is supplied in such quantity to maintain the alternating component of streaming potential at a selected value, e.g., one of the values indicated in Table I. If the streaming potential varies from such value, either because of undesired change in double-layer controlling additive or because of additional or fewer turbid particles or the like in the liquid stream, then the amount of double-layer controlling additive is adjusted until the alternating component of streaming potential once again has the desired value. Any value of alternating streaming potential may be selected with the manual set point of controller 126 at 128, but for ordinary purposes those values indicated in Table I will be chosen, or corresponding proportional values derived from a measuring device having somewhat different dimensions. It is found possible with this system to continuously hold the addition of the double-layer controlling additive at a level of maximum effectiveness thereby making possible substantially complete capture of turbid particles over an extended period of time. It is found that since this system is always at its maximum effectiveness, that a substantial increase in operating rate for many water filtration plants is possible, e.g., an increase in flow rate of 100 percent. Also, since the addition of double-layer controlling additive is always held at the correct level, it is found that improved adhesion of turbid particles to filter media takes place such that breakthrough or scaling off of such particles, theretofore captured by the filter, does not occur. This factor contributes to an allowable increase in operating rate for a water filtration plant. Of course, holding the supply of additive continuously at maximum effectiveness despite changes in water turbidity and the like results in a continuously purer clearwell than heretofore easily obtained.

It is noted from the FIG. 1 diagram that the measurement apparatus 26 continually receives a stream of liquid from the system, here flocculation tank No. 6, at a point in the system removed in space and time from the delivery of double-layer controlling additive. Measurement of the AC component of streaming potential at various other points in the system has indicated that such measurement should be made after a considerable reaction time elapses subsequent to the addition of the double-layer controlling additive. Hence, it is desirable to provide an extended alum reaction zone 16 within which the liquid remains for a period of at least fifteen seconds before receiving such liquid in the flocculation tanks. It is also desirable that some time elapse in these tanks before a stream is withdrawn therefrom for application to the measurement apparatus. Thus, the measurement stream is derived from the last tank, i.e., tank No. 6.

FIG. 5 is a graph of the alternating component of streaming potential versus time in the system of FIG. 1 for two different approximate dosages of double-layer controlling additive material, that is, for two different selected potentials as measured in flocculation tank No. 6. The time scale in minutes corresponds to the passage of liquid through the system such that the liquid starting out at point 12 at time zero will have reached No. 4 flocculation tank after a period of six minutes, and No. 6 flocculation tank after a period of approximately eleven minutes. It is seen that immediately after an addition of the double-layer controlling additive, e.g., alum, at time zero, the measurement which can be made of the alternating component of streaming potential fluctuates quite noticeably, i.e. in a negative direction, and then proceeds to rise until a stable value is eventually reached. Both curves 154 and 156 exemplify this effect, curve 156 representing the addition of a lower level of alum. At a time between one and three minutes after the addition of the double-layer controlling material, a coagulant aid is advantageously added, such aid comprising activated silica in the illustrated embodiment. The exemplary time of addition is indicated on the FIG. 5 plot. The addition of this coagulant aid has the effect of lessening the downward dip in the curve of FIG. 5 even though the coagulant aid is added at a time after such dip appears to take place, that is, downstream in the system from where the dip would be registered. Moreover, the coagulant aid stabilizes the system so that the alternating component of streaming potential settles down to a reasonably constant value at the time and point in the system where it is measured, e.g., flocculation tank No. 6 in the present system. Without the addition of this coagulant aid, a certain drift may occur in measured value because the alternating component of streaming potential and the corresponding energy component contributing to an interaction by a particle or surface has not stabilized within the time allotted. Of course, where a lengthy period of time is available, the coagulant aid is not entirely necessary provided the measurement is made on the alternating component of streaming potential sufficiently long after the addition of the double-layer controlling additive. The coagulant aid is preferably added soon after the downward dip in the measurement as indicated on FIG. 5. In the system of FIG. 1, this addition is made at the location of flocculation tank No. 1. As well as stabilizing the measurement, the addition of such material also serves the more conventional purpose of assisting the bringing about of flocculation and settling in tanks Nos. 1 through 6. The tanks are labelled "alum-$SiO_2$ reaction zone" in FIG. 1 denoting their double purpose as a reaction zone and as a region for flocculation and settling.

Other coagulant aids may be employed in place of activated silica. A caustic or alkaline material will exert a similar effect as to double-layer additive stabilization. Lime, sodium carbonate or sodium bicarbonate may be used.

Sometimes a period of time, for example two days or more, may be required for the various surfaces in a water treatment plant to acquire the same double-layer properties and to stabilize at a given condition for the maximum capture of particles by the filter media. After stabilization of the system, changes in turbidity do not affect the system but are automatically and continuously compensated for as described.

The utility of the present invention is not limited to water treatment plants of the type illustrated in FIG. 1. Thus, the stream of fluid instead of comprising water from which particles are to be removed may alternatively comprise a mixture of water with clay, filler and wood pulp fibers providing the "furnish" for a paper machine. Adjusting the double-layer controlling additive to this material continuously and exactly results in superior retention of the clay and filler on the wood pulp fibers. It is possible to correlate the effect of the double-layer controlling additive, e.g., the effect of the alum, with the sizing properties of the paper being produced.

It is also sometimes desirable to adjust the double-layer properties of the fluid so that a selected repulsion occurs between particles. Thus, in the production of paper and the like, considerable adjustment can be made in the properties of the resultant product by adjustment of the double-layer controlling additive under the control of the AC streaming potential. In such case, the AC streaming potential maintained may not necessarily be the value which produces minimum repulsion between particles, but may be a value found to produce advantageous results in the final product. There are many uses to which the present invention may be applied.

Various changes may be made in the method and apparatus of the present invention without departing from the present invention. For example, the frequency of the alternating component of streaming potential provided by driver 74 was advantageously found to be approximately 46 cycles per second but other frequencies may be used. This frequency of alternating potential is advantageously measured by an AC amplifier 36 such as the type employed in a vacuum tube voltmeter, but is not so close to 60 cycles that the AC potential measured will be masked by 60-cycle power line interference in the vicinity of the present apparatus. If 60-cycle interference becomes objectionable in the apparatus, it may, of course, be suitably applied to amplifier 36 in a subtractive manner well known by those skilled in the art so as to balance out stray 60-cycle interference. Driver frequencies above 60 cycles may also be employed. It is frequently desirable to electrostatically and electromagnetically shield the measurement apparatus 26 by mounting it in a steel cabinet or the like to minimize stray interference.

While I have shown and described a preferred embodiment of my invention, it will be apparent to those skilled in the art that many other changes and modifications in the art may be made without departing from my invention in its broader aspects. I therefore intend the appended claims to cover all such changes and modifications as fall within the true spirit and scope of my invention.

What is claimed is:
1. A continuous flow liquid treatment method for a liquid predominantly comprising water and also including particles carried in said liquid comprising:
   supplying a double-layer controlling additive to said liquid,
   providing a continuous stream of said liquid and modulating said continuous stream at an alternating rate to provide an alternating function of a streaming potential thereof,
   measuring said alternating function of streaming potential, and controlling the supply of the double-layer controlling additive in response to said alternating function for maintaining said function at a selected value.

2. The method according to claim 1 wherein said selected value is predetermined to minimize repulsion of said particles.

3. The method according to claim 1 wherein said liquid comprises water carrying clay, filler and wood pulp fibers.

4. The method according to claim 1 wherein said liquid comprises turbid water and additionally includes an added coagulant aid.

5. The method according to claim 4 wherein said coagulant aid is activated silica.

6. The method according to claim 1 wherein said double-layer controlling additive is alum.

7. A method of measuring double-layer properties of a liquid comprising:
forming a continuous stream of such liquid,
continuously modulating the flow of such stream at an alternating rate to generate an alternating function of the streaming potential of said stream,
and measuring said alternating function of said streaming potential thus obtaining an accurate measurement of double-layer properties in said stream substantially independent of stray DC voltages.

8. A continuous flow liquid treatment apparatus for a liquid predominantly comprising water and also including particles carried in said liquid comprising:
means for continuously measuring an energy component of a particle surface in the form of an alternating function of streaming potential in said liquid, said means receiving a portion of said liquid as a continuous flow stream and including means for modulating the flow of said stream at an alternating rate as well as electrical measurement means disposed along said stream to measure said function,
means for supplying a double-layer controlling additive to said liquid,
and means for operating said supplying means to provide additive in response to the measured alternating function for maintaining said function at a selected value.

9. The apparatus according to claim 8,
including means for continuously withdrawing said portion of said liquid from said continuous flow system,
and isolating means for disposing of said portion after passage thereof through said measuring means.

10. The apparatus according to claim 8 wherein said means for measuring an alternating function of streaming potential includes means for measuring streaming potential comprising an alternating current amplifier receiving such streaming potential from said measurement means.

11. The apparatus according to claim 8 wherein said means for modulating the flow comprises a vibratory means located proximate an inlet for said continuous flow stream for modulating the flow of liquid in said stream at a predetermined frequency to provide said alternating function of streaming potential.

12. The apparatus according to claim 8 wherein said measuring means comprises a capillary tube continuously receiving said portion of said liquid from said system.

13. The apparatus according to claim 8 wherein the means for continuously supplying a double-layer controlling additive comprises a delivery valve means for supplying said additive to said liquid in said continuous flow system prior to said means for measuring an alternating function of streaming potential.

14. The apparatus according to claim 13 for treating turbid liquid further including filter means for receiving said liquid after said means for measuring an alternating function of streaming potential in said liquid,
and wheren said selected value of said alternating function is predetermined to produce minimized repulsion between said particles in the turbid liquid and said filter means.

15. The apparatus according to claim 8 wherein said operating means includes integrating means receiving control information from said measuring means for integration thereof before application of said information to control said supplying means.

16. Measurement apparatus for measuring double-layer properties of a liquid, said apparatus comprising:
means for measuring an alternating function of streaming potential including a liquid-conveying passage having inlet means providing a stream of liquid through said passage,
means for modulating the flow of the substantially continuous stream of liquid through said passage at an alternating rate for causing said alternating function of streaming potential,
and means disposed along said stream for continuously measuring said alternating function as developed at said alternating rate.

17. Measurement apparatus for measuring double-layer properties of a liquid predominantly comprising water, said apparatus comprising:
inlet and outlet means for said liquid,
a vertically disposed capillary means for receiving liquid from said inlet means and conveying the same to said outlet means,
vibratory means located proximate said inlet means and connected for modulating the flow of liquid in said capillary,
electrical measuring means,
and conducting means extending from said capillary means to said electrical measuring means for measuring the modulated streaming potential developed along said capillary.

18. A liquid treatment system comprising:
first conduit means for receiving input liquid and including a valve proximate the inlet end thereof for receiving a double-layer controlling additive, and a mixing valve for providing dispersion of said double-layer controlling additive in said liquid, said conduit means comprising a reaction zone for said liquid and said double-layer controlling additive,
a plurality of serially related flocculating chambers, the first receiving the output of said conduit means and each discharging into the next successive chamber,
a settling basin receiving the output of the last flocculating chamber,
a plurality of filters for receiving liquid from said settling basin and providing a filtered water output,
means for continuously receiving a sample of liquid from one of said flocculating chambers including continuous flow means for measuring an alternating function of streaming potential in said liquid and continuous discharge means,
means for continuously modulating the flow of the sample of liquid at an alternating rate for causing said alternating function of streaming potential,
alternating current amplifier means receiving said alternating function of streaming potential,
and means operated by an output of said alternating current amplifier means for continuously controlling the valve by which said double-layer controlling additive is supplied to said conduit.

References Cited

UNITED STATES PATENTS

| | | | |
|---|---|---|---|
| 2,299,529 | 10/1942 | Crampton | 210—96 |
| 2,365,360 | 12/1944 | Smith | 210—388 |
| 2,661,332 | 12/1953 | Mortenson | 210—96 X |
| 3,078,709 | 2/1963 | Clark | 73—61 |
| 3,250,392 | 5/1966 | Luck | 210—96 |
| 3,287,263 | 11/1966 | Johnson et al. | 210—51 X |
| 3,349,354 | 10/1967 | Miyata | 210—222 X |

REUBEN FRIEDMAN, *Primary Examiner.*

JOHN ADEE, *Assistant Examiner.*

U.S. Cl. X.R.

210—73, 96, 199, 202, 259; 137—93; 73—61

PO-1050
(5/69)

UNITED STATES PATENT OFFICE
CERTIFICATE OF CORRECTION

Patent No. 3,441,956  Dated April 29, 1969

Inventor(s) WILLARD FARNHAM

It is certified that error appears in the above-identified patent and that said Letters Patent are hereby corrected as shown below:

Column 2, line 67, after "through" insert a period --.-- and change "the" to --The--. Column 5, line 2, "dics" should read --disc--.

Column 7, lines 10 through 22, the Table should read:

TABLE I

| Zone | Energy Component AC Streaming Potential millivolts, r.m.s. | Energy of Interaction | |
|------|---------------------------------------------|------|-----------|
|      |                                             | Sign | Magnitude |
|      |                                             | +    |           |
| C+   | 6.6(+) ± .2                                 | -    | strong    |
|      |                                             | +    |           |
| B+   | 2.6(+) ± .1                                 | -    | strong    |
|      |                                             | +    |           |
| A+   | .16(+) ± .1                                 | -    | strong    |
|      |                                             | zero |           |
| A-   | .14(-) ± .1                                 | -    | strong    |
|      |                                             | +    |           |
| B-   | 2.4(-) ± .1                                 | -    | strong    |

Column 9, line 53, "lenghy" should read --lengthy--. Column 11, line 68, "wheren" should read --wherein--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents